(12) United States Patent
Coupland et al.

(10) Patent No.: US 10,843,174 B2
(45) Date of Patent: Nov. 24, 2020

(54) CATALYST MANUFACTURING METHOD

(71) Applicant: JOHNSON MATTHEY PUBLIC LIMITED COMPANY, London (GB)

(72) Inventors: Duncan Roy Coupland, Hertfordshire (GB); Jonathan David Phillips, Hertfordshire (GB); Sophie Winfield, Hertfordshire (GB)

(73) Assignee: Johnson Mattey Public Limited Company, London (GB)

( * ) Notice: Subject to any disclaimer, the term of this patent is extended or adjusted under 35 U.S.C. 154(b) by 0 days.

(21) Appl. No.: 15/536,382

(22) PCT Filed: Dec. 18, 2015

(86) PCT No.: PCT/GB2015/054079
§ 371 (c)(1),
(2) Date: Jun. 15, 2017

(87) PCT Pub. No.: WO2016/097760
PCT Pub. Date: Jun. 23, 2016

(65) Prior Publication Data
US 2017/0348676 A1   Dec. 7, 2017

(30) Foreign Application Priority Data
Dec. 19, 2014   (GB) .................................. 1422825.8

(51) Int. Cl.
| *B01J 23/83* | (2006.01) |
| *B01J 23/40* | (2006.01) |
| *B01J 23/72* | (2006.01) |
| *B01J 23/74* | (2006.01) |
| *B01J 29/06* | (2006.01) |
| *B01J 35/00* | (2006.01) |
| *B01J 35/04* | (2006.01) |
| *B01J 35/10* | (2006.01) |

(Continued)

(52) U.S. Cl.
CPC .............. *B01J 23/83* (2013.01); *B01J 23/40* (2013.01); *B01J 23/72* (2013.01); *B01J 23/74* (2013.01); *B01J 23/76* (2013.01); *B01J 23/89* (2013.01); *B01J 29/06* (2013.01); *B01J 35/0026* (2013.01); *B01J 35/04* (2013.01); *B01J 35/1038* (2013.01); *B01J 37/0018* (2013.01); *B01J 37/0215* (2013.01); *B01J 37/0219* (2013.01); *B01J 37/0246* (2013.01); *B01J 37/04* (2013.01); *B01J 37/08* (2013.01); *C04B 35/111* (2013.01); *C04B 35/18* (2013.01); *C04B 35/195* (2013.01); *C04B 35/634* (2013.01); *C04B 35/636* (2013.01); *C04B 38/0096* (2013.01); *C10G 49/02* (2013.01); *B01J 35/002* (2013.01); *B01J 35/1042* (2013.01); *C04B 2111/0081* (2013.01); *C04B 2235/3206* (2013.01); *C04B 2235/3208* (2013.01); *C04B 2235/3232* (2013.01); *C04B 2235/3281* (2013.01); *C04B 2235/5212* (2013.01); *C04B 2235/5409* (2013.01); *C04B 2235/5436* (2013.01); *C04B 2235/6026* (2013.01); *C04B 2235/6567* (2013.01); *C04B 2235/77* (2013.01); *C04B 2235/96* (2013.01); *C10G 70/042* (2013.01); *C10G 2300/70* (2013.01)

(58) Field of Classification Search
CPC ........ B01J 23/83; B01J 37/0215; B01J 29/06; B01J 23/74; B01J 23/72; B01J 23/40; B01J 37/0219; B01J 37/0246; B01J 35/0026; B01J 35/04; B01J 35/1038; B01J 37/08; B01J 37/04; B01J 23/89; B01J 37/0018; B01J 23/76; B01J 35/002; B01J 35/1042; C04B 35/111; C04B 35/18; C04B 35/195; C04B 35/634; C04B 35/636; C04B 38/0096; C04B 2235/3281; C04B 2235/96; C04B 2235/77; C04B 2235/6567; C04B 2235/3206; C04B 2235/3208; C04B 2235/3232; C04B 2235/6026; C04B 2235/5212; C04B 2235/5409; C04B 2235/5436; C04B 2111/0081
See application file for complete search history.

(56) References Cited

U.S. PATENT DOCUMENTS 5,175,132 A * 12/1992 Ketcham ............... C04B 35/111
501/103
5,192,515 A *  3/1993 Gardner-Chavis ..........................
B01D 53/945
423/213.2
(Continued)

FOREIGN PATENT DOCUMENTS

| EP | 1710009 A1 | 10/2006 |
| RU | 2252064 A  |  3/2004 |

(Continued)

OTHER PUBLICATIONS

International Search Report, dated Mar. 4, 2016, from corresponding PCT/GB2015/054079 application.

Primary Examiner — Anthony J Zimmer
(74) Attorney, Agent, or Firm — BakerHostetler

(57) ABSTRACT

A method for producing a catalyst or catalyst precursor is described including: applying a slurry of a particulate catalyst compound in a carrier fluid to an additive layer manufactured support structure to form a slurry-impregnated support, and drying and optionally calcining the slurry-impregnated support to form a catalyst or catalyst precursor. The mean particle size (D50) of the particulate catalyst compound in the slurry is in the range 1-50 μm and the support structure has a porosity ≥0.02 ml/g.

29 Claims, 1 Drawing Sheet

(51) Int. Cl.
*B01J 37/04* (2006.01)
*B01J 23/89* (2006.01)
*B01J 23/76* (2006.01)
*B01J 37/00* (2006.01)
*B01J 37/08* (2006.01)
*B01J 37/02* (2006.01)
*C04B 35/18* (2006.01)
*C04B 35/636* (2006.01)
*C04B 35/111* (2006.01)
*C04B 35/195* (2006.01)
*C04B 35/634* (2006.01)
*C04B 38/00* (2006.01)
*C10G 49/02* (2006.01)
*C04B 111/00* (2006.01)
*C10G 70/04* (2006.01)

(56) References Cited

U.S. PATENT DOCUMENTS

| | | |
|---|---|---|
| 6,946,107 B2 | 9/2005 | Carlborg et al. |
| 2004/0223897 A1 | 11/2004 | Yeo |
| 2005/0227869 A1* | 10/2005 | Ohno .............. B01D 53/9431 502/439 |
| 2008/0317646 A1 | 12/2008 | Morisaka et al. |
| 2010/0093527 A1 | 4/2010 | Hasselmann |
| 2010/0222209 A1 | 9/2010 | Kashani-Shirazi et al. |
| 2013/0230721 A1 | 9/2013 | Coupland |
| 2014/0178262 A1 | 6/2014 | Tran et al. |
| 2015/0201500 A1* | 7/2015 | Shinar .................. H05K 3/125 425/132 |

FOREIGN PATENT DOCUMENTS

| | | |
|---|---|---|
| RU | 2329100 A | 6/2006 |
| WO | 98/28073 A1 | 7/1998 |
| WO | 2004096702 A2 | 11/2004 |
| WO | 2004096703 A2 | 11/2004 |
| WO | WO 2008/094889 A1 | 8/2008 |
| WO | WO2009/047141 A1 | 4/2009 |
| WO | 2012/032325 A1 | 3/2012 |

* cited by examiner

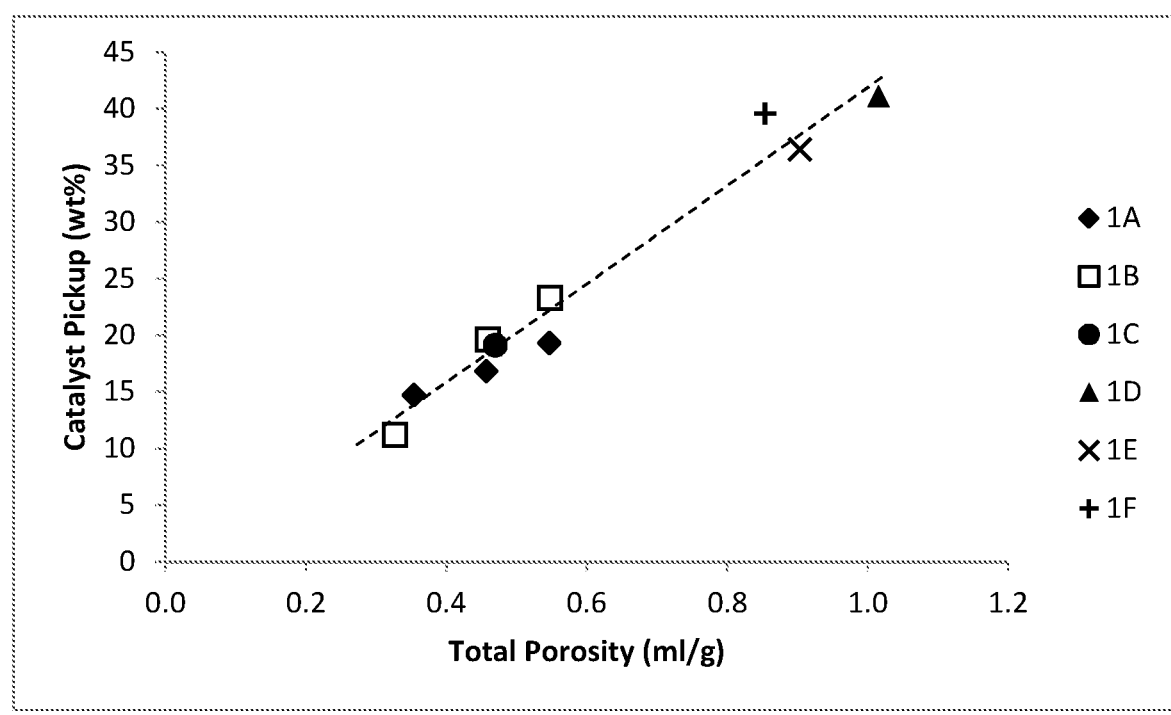

CATALYST MANUFACTURING METHOD

CROSS REFERENCE TO RELATED APPLICATIONS

This application is the National Stage of International Patent Application No. PCT/GB2015/054079, filed Dec. 18, 2015, which claims the benefit of priority of Great Britain Patent Application No. 1422825.8, filed Dec. 19, 2014.

TECHNICAL FIELD

This invention relates to the manufacture of catalysts using a support prepared by additive layer manufacturing.

BACKGROUND

Heterogeneous catalysts are typically manufactured by pelleting, extruding or granulating a powdered catalytic metal compound followed by a calcination, and/or optionally a reduction stage. Alternatively, catalyst supports formed by pelleting or extruding catalytically inert materials may be impregnated with solutions of catalyst compounds and dried prior to the calcination and/or reduction stages. The pelleting, extrusion and granulating methods while effective, offer limited variability in catalyst geometry and physical properties. For treating exhaust gases from vehicles and power stations, powdered catalyst can be prepared as an aqueous slurry and coated ("washcoated") onto an inert honeycomb substrate monolith, such as a so-called flow-through or wall-flow filter honeycomb substrate.

Additive layer manufacturing (ALM) is a technique whereby 2-dimensional layers of powdered materials are sequentially laid down and fused or bound together to form 3-dimensional solid objects. The technique has been developed for the fabrication of metal and ceramic components for use in aerospace and medical applications.

WO2012032325 discloses a method for producing a catalyst using an additive layer method comprising: (i) forming a layer of a powdered catalyst or catalyst support material, (ii) binding or fusing the powder in said layer according to a predetermined pattern, (iii) repeating (i) and (ii) layer upon layer to form a support structure, and (iv) optionally applying a catalytic material to said support structure.

BRIEF DESCRIPTION OF THE DRAWINGS

FIG. 1 illustrates a plot of catalyst loading against the total porosity for the supports 1A-1F as presented in Example 2.

We have found an improved method by which catalyst may be provided on ALM supports.

Accordingly the invention provides a method for producing a catalyst or catalyst precursor comprising: (i) applying a slurry of a particulate catalyst compound in a carrier fluid to an additive layer manufactured support structure to form a slurry-impregnated support structure, and (ii) drying and optionally calcining the slurry-impregnated support to form a catalyst or catalyst precursor, wherein the mean particle size (D50) of the particulate catalyst compound in the slurry is in the range 1-50 µm and the support structure has a porosity ≥0.02 ml/g.

The method provides catalysts with enhanced properties over the conventional processes and enables the use of catalysts compounds not suited to impregnation via soluble salts.

The term, "mean particle size" used herein is the D50 and is expressed in µm (micrometres or microns). The mean particle size distribution in the slurry may be determined by conventional laser light scattering methods. For example, particle size measurements may be obtained by Laser Diffraction Particle Size Analysis using a Malvern Mastersizer 2000, which is a volume-based technique (i.e. D50 and D90 may also be referred to as $D_v50$ and $D_v90$ (or D(v,0.50) and D(v,0.90)) and applies a mathematical Mie theory model to determine a particle size distribution.

The term, "porosity" used herein is the total pore volume as determined by porosimetry and may be expressed as ml/g or $cm^3/g$.

The support structure is prepared by an additive-layer manufacturing (ALM) process, which is also known as layer manufacturing, constructive manufacturing, generative manufacturing, direct digital manufacturing, freeform fabrication, solid freeform fabrication, rapid prototyping or 3D printing. The ALM processes is enabled by conventional 3D design computer packages that allow design of the support structure as a so-called, "STL file", which is a simple mesh depiction of the 3D shape. The STL file is dissected using the design software into multiple two-dimensional layers, which are the basis for the fabrication process. The ALM fabrication equipment, reading the two-dimensional pattern, then sequentially deposits layer upon layer of powder material corresponding to the 2D slices. In order that the support structure has structural integrity, the powder material is bound or fused together as the layers are deposited. The process of layer deposition and binding or fusion is repeated until a support structure is generated. The un-bound or un-fused powder is readily separated from the support structure, e.g. by gravity, tumbling, sieving or blowing. Known 3D printing techniques may be used to prepare the support structure.

Preferably, the support structure preparation method comprises, (i) combining a particulate support material with a binder to form a preform mixture, (ii) forming a layer of the preform mixture, (iii) applying a binding solvent to the layer of preform mixture from a print-head according to a predetermined pattern to bind the particulate support material, (iv) repeating steps (ii) and (iii) layer upon layer, (v) removing un-bound material and (vi) drying and optionally calcining to form the support structure.

The particulate support material is typically a powder with a mean particle size in the range 0.1 to 400 µm. The mean particle size may be in the range 100 to 300 µm, or smaller means may be used, for example 20-75 µm, or 0.1-15 µm, for example 2-4 µm. Mixtures of particles with different means may be used, for example 10-90% by weight of a first particulate support material with a mean particle size in the range 0.1-15 µm and 10-90% by weight of a second particulate support material with a mean particle size in the range 20-75 µm. Materials with the desired mean particle sizes are available commercially or may be generated using known methods such as milling and sieving. By careful selection of the particle size and particle size distribution of the support material used in the additive layer manufacturing process the pore volume and pore size distribution of the resulting support structure may be controlled.

The porosity of the support is ≥0.02 ml/g, preferably ≥0.1 ml/g and may be in the range 0.1-1.4 ml/g, particularly 0.3-0.8 ml/g. The porosity arises from the spaces between the particles of particulate support material plus any pores in the support material itself. Where the support material retains significant porosity after calcining this may be of benefit to the resulting catalyst, but it is not essential that such porosity is retained in the present invention. For example low porosity/surface area supports such as alpha-alumina or zirconia may effectively be used to prepare supports.

The ALM method of support construction allows the pore size distributions to be potentially tailored to each application. Thus in addition to the mean pore size, which may also be expressed as a D50 figure, the range of pore sizes, which may be expressed as the difference between the D10 and the D90 figures, may be effected by the ALM method. The D50 of the pores of the support is preferably in the range 10-25 µm. The difference between the D10 and D90 may be in the range 30 to 50 µm. Pore size distributions may be readily determined for the supports using mercury intrusion porosimetry. The pore size distribution may be illustrated by a plot of log differential mercury intrusion against pore size diameter (in µm) which generally shows one, two or three peaks corresponding to mono-, bi-, or tri-modal pore size distributions. In the present invention, the porosity may be determined from the area under the peak or peaks. The pore size distribution may be regarded as the range of pore sizes under the major peak, i.e. the range of pore sizes that contribute the greatest to the overall porosity of the catalyst support. The D50 in this case corresponds to the size of 50% of the pores in this range, the D10 is 10% and the D90, 90%.

Furthermore the printing resolution of the 3-D printer head may be used to influence the properties of the catalyst structure. Variations in the printing resolution have been found to change the density of the resulting structure with a direct relationship, independent of the binder, found between the density and porosity. Higher densities may be achieved at higher printing resolution, providing enhanced strength, but with lower porosity. Printing resolution may be adjusted in both the x- and y-directions. A printing resolution in the x-direction in the range 40 µm to 70 µm and in the y-direction of 80 to 100 µm for layer thicknesses in the range 50 to 150 µm has been found to be optimal for the preparation of the catalyst support structures. The liquid drop mass may be in the range 50 to 250 ng, preferably 110 to 160 ng.

The binder may be a powder in which case the particulate support material and binder may be blended to form the preform mixture. Alternatively the binder may be coated, e.g. from a solution or melt, onto the surface of the particulate support material. The binder/particulate support material weight ratio may be 0.05/1 to 2/1. The amount of binder used may be in the range 1-30% by weight of the preform mixture with 5-15% by weight of the preform mixture proving particularly useful. Preferred binders are organic polymers such as dextrin, sucrose, poly(vinyl alcohol) (PVA) and mixtures thereof. Organic polymers have the advantage that they may be removed from the support structure by subsequent heat treatments. PVA, in particular >80% hydrolysed PVA with a mean molecular weight of 20,000 to 30,000, has been found to be particularly effective in the present invention. The mean particle size of the binder may be in the same range as the particulate support material.

Strengthening agents such as polymer or ceramic fibres (e.g. cellulose fibres) may also be included at 1-10% by weight of the preform mixture. Additionally or alternatively, the preform mixture may comprise 1-20% by weight of a cement powder such as a calcium aluminate cement or a calcium silicate cement. Cements may be effective in increasing the strength of the support structure.

In addition to the particulate support material, binder and any strengthening agents, the preform mixture may contain 0.5 to 5% by weight of one or more sintering aids that improve the sintering of the particulate support material during the formation of the support structure. Improved sintering improves the strength of the structure before and after calcination and may be used to influence the porosity and surface area of the catalyst. Sintering aids that may be used include titanium (IV) oxide ($TiO_2$), iron (III) oxide ($Fe_2O_3$), copper (II) oxide (CuO) magnesium oxide (MgO) and calcium carbonate ($CaCO_3$). In particular, mixtures of titanium (IV) oxide and iron (III) or copper (II) oxides have been found to be effective. The preferred weight ratios of $TiO_2$ to $Fe_2O_3$ or CuO are 40:60 to 60:40.

The preform mixture may be prepared simply by mixing in any order the particulate support material and binder, and any strengthening agents or sintering aids. It is desirable to use particulate materials with similar mean particle sizes and densities if possible to minimise segregation of the components on the mixture. If desired sintering aid and particulate support material may be premixed and sieved prior to mixing with the binder. The preform mixture if desired may be sieved to control the particle size used to prepare the support structures. For example, sieving the preform mixture to a particle size below 100 µm provides a support structure that is able to produce eggshell catalysts, whereas sieving to a particle size in the range 100-200 µm provides a support structure through which the slurry impregnation is complete and homogeneous.

The layers of preform material may be in the range 0.02 to 5.0 mm thick, preferably 0.02 to 2.5 mm thick, more preferably 0.02 to 0.5 mm thick.

The binding solvent may be any liquid that dissolves the binder and causes the particles of support material to bind together according to the pre-determined pattern. One or more binding solvents may be used. Organic solvents such as ketones, alcohols or hydrocarbons may be used, but preferably the binding solvent is aqueous and preferably is water. If desired, acids, bases or other soluble compounds, such as surfactant may be included in the binding solvent.

The material not bound together by action of the binder and binding solvent remains unbound. The un-bound material may be separated from the support structure by gravity, tumbling, sieving or by blowing.

Suitable equipment for producing catalyst support structures as described herein is available commercially from Voxeljet Technology AG in Germany and the Z-Corporation in the USA.

The support structure is dried to remove binding solvent, for example at 25-125° C., preferably 25-110° C. Often it will be desirable to apply a calcination stage to the dried support structure to increase the strength of the support structure. Calcination temperatures may be in the range 500-2000° C., preferably 800-1800° C. Drying and calcination may be performed in air or under an inert gas such as nitrogen or argon. Drying and calcination may be performed at atmospheric pressure or under vacuum if desired.

The support structures produced by the ALM method may be a monolith such as honeycomb or other related structure comprising a plurality of parallel channels separated by walls which may be straight or curved. Using ALM, monolith structures with new geometries may be created and may be particularly useful on automotive or stationary internal combustion engine exhaust systems, e.g. honeycomb substrate monoliths of the flow-through configuration which may, as desired, have end-plugs inserted in a chequer board pattern at either end thereof to create a wall-flow filter arrangement. Typically, monolith structures have a cross-sectional size in the range 100-1000 mm. Alternatively, the support structures may be suitable for use in a packed bed. Such support structures have a cross-sectional size in the range 0.2 to 50 mm, more preferably 1 to 25 mm, most preferably 2 to 10 mm. There is almost no limit to the geometry of the catalyst support structures that may be fabricated using the ALM technique. The structural complexity may range from skeletal frame and lattice or lace work structures to multi-featured and facetted solid structures. For example, the support structure may be in the form of wire-frame or skeletal framework structures containing a void space within and which may have multiple internal strengthening rods, or the support structure may be a solid unit, such as a cylinder, which may be configured with domed ends, multiple lobes and/or through holes, which may be circular, ellipsoid or polygonal in cross section.

The particulate support material present in the support structure may comprise a single or mixed metal oxide or a composition comprising two or more metal oxides. Hence, the particulate support material may comprise an alumina, metal-aluminate, silica, alumino-silicate, cordierite, titanium (IV) oxide, zirconia, cerium (IV) oxide, zinc oxide, or a mixture thereof. Alternatively, the particulate support material may comprise a zeolite, which may contain one or more transition metals, such as copper, cobalt, iron and nickel. Zeolites are particularly useful for selective catalytic reduction (SCR) of oxides of nitrogen in exhaust gases emitted from vehicles when promoted, e.g. via ion-exchange, with copper and/or iron. Particularly suitable zeolites are formed from chains of 6-membered rings and include the Chabazite framework (CHA); the Faujasite framework (FAU) and the Mordenite framework (MOR). Molecular sieves having the Framework Type Code AEI and promoted with copper are particularly useful for promoting the SCR reaction in vehicle applications. Alternatively, the catalyst support powder may be a metal powder, such as a precious metal powder or a non-precious metal powder such as a ferritic alloy or steel powder. Other particulate support materials such as silicon carbide, silicon nitride or carbon may be used.

Aluminous materials including hydrous aluminas such as boehmite or alumina trihydrate, transition aluminas such as delta-, gamma- and theta-alumina, or alpha alumina are particularly suitable particulate support materials especially with porosities in the range 0.1-0.7 mL/g. One or more aluminous materials may be used. Mixed metal aluminate materials may also be used, such as lanthana-alumina, cerium (IV) oxide-alumina and cerium (IV) oxide-zirconia-alumina.

In the present invention, a slurry of a particulate catalyst compound in a carrier fluid is applied to the support structure. The particulate catalyst compound may be the same or different from the particulate support material used in the support structure. The slurry may be applied by spraying the support structure with slurry, tumbling the support structure in the slurry or dipping the support structure in the slurry.

The slurry desirably has a solids content in the range 5 to 80% by weight and may be stabilised by conventional techniques. The slurry may be aqueous or non-aqueous, however aqueous slurries are preferred. Thus the carrier fluid used to slurry the particulate catalyst compound may be a ketone, alcohol, ester or suitable liquid hydrocarbon, but is preferably water. The slurry may be prepared using conventional catalyst wash-coat preparation techniques. The mean particle size of the particulate catalyst compound in the slurry is in the range 1 to 50 µm, most preferably 1-20 µm, especially 1-10 µm. It has been found that for improved distribution of the catalyst in the support structure, that the mean particle size of the particulate catalyst compound is less than the pore size distribution. Materials with the desired average particle sizes are available commercially or may be generated using known methods such as milling.

The particulate catalyst compound applied to the support structure may comprise a metal powder, metal compound or a zeolite.

Where the particulate catalyst compound is a metal powder, preferably it comprises a precious metal powder selected from one or more of Pt, Pd, Rh, Ir, Ru, Re.

Where the particulate catalyst compound is a metal compound it may be selected from one or more transition metal compounds, including lanthanide metal compounds and actinide metal compounds. The transition metal compound comprises one or more metals selected from the group consisting of Na, K, Mg, Ca, Ba, Al, Si, Ti, V, Cr, Mn, Fe, Co, Ni, Cu, Zn, Y, Zr, Nb, Mo, Ru, Rh, Pd, Ag, Sn, Sb, La, Hf, W, Re, Ir, Pt, Au, Pb, or Ce. The metal compound may be a metal oxide, metal hydroxide, metal carbonate, metal hydroxycarbonate or mixture thereof. Metal oxides may comprise a single or mixed metal oxide such as a spinel or perovskite, or a composition comprising two or more metal oxides. Preferred particulate catalyst compounds comprise one or more catalytic metals selected from Ni, Co, Mo, W, Cu, Fe, Pt, Pd, Rh and Ir. The particulate catalyst compound may be a bulk catalyst particle in which the catalytic metal is distributed throughout the particle, or the particulate catalyst compound may be a coated catalyst particle in which the catalytic metal is present as a surface layer on the surfaces of the particle. Hence the particulate catalyst compound may be formed by precipitation or impregnation of support materials using known methods and, if necessary, milled to the desired mean particle size. Particular embodiments of particulate catalyst compounds of this type comprise one or more of Pt, Pd, Rh and Ir coated onto support materials such as alumina, titanium (IV) oxide, zirconia, cerium (IV) oxide and mixtures thereof, and coated or bulk catalyst particles comprising one or more catalytic metals selected from Ni, Co, Mo, W, Cu and Fe, for example oxides of Ni, Co, Mo, W, Cu and Fe, including Cu—Al oxides, Co—Al oxides, Co—Zr oxides, Co—Ce oxides, Co—Mn oxides, Cr—Co oxides and LaCeCo oxides. In one embodiment, the particulate catalyst compound may be $LaCoO_3$, including $LaCoO_3$ in which partial substitution (e.g. up to 20 mole %) of the A-site has been made by e.g. Sr or Ce, or partial substitution (e.g. up to 50 mole %) of the B-site has been made by e.g. Cu), $La_2CoO_4$, $Co_3O_4$ supported on alumina, $Co_3O_4$ promoted by rare earth elements and optionally containing one or more of oxides of Mn, Fe, Mg, Cr or Nb, CoOx with Pt on a support. Especially suitable catalysts are cerium-doped $LaCoO_3$ catalysts e.g. $La_xCe_{1-x}CoO_3$ where x is 0.8-0.99, especially $La_{0.8}Ce_{0.2}CoO_3$, described in WO 98/28073 A, herein incorporated by reference.

Where the particulate catalyst compound is a zeolite preferably it comprises chains of 6-membered rings, such as the Chabazite framework (CHA); the Faujasite framework (FAU) and the Mordenite framework (MOR) and the AEI framework. The zeolite may contain oxides of one or more transition metals, such as copper, cobalt, iron and nickel.

The support structure that has been impregnated with the slurry of particulate catalyst compound, i.e. the slurry-impregnated support structure, is dried to remove the carrier fluid. The drying step may be carried out at 25-125° C.

The amount of particulate catalyst compound applied to the support structure may be adjusted by increasing or decreasing the solids content of the slurry and the contact time. However we have found that the particle size of the catalyst compound coupled with the porosity of the support structure may be more important in determining the overall catalyst content. For example, milling the catalyst compound in solution to produce a lower mean particle size distribution has been found to generally increase the catalyst loading.

It may be desirable to apply a calcination procedure to the dried catalyst-impregnated support structure to convert any non-oxide compounds present to the corresponding oxide, or to produce crystalline oxidic materials such as spinel or perovskite structures with improved stability or more selective catalytic properties. Calcination temperatures may be in the range 300-1200° C., preferably 400-900° C. Drying and calcination may be performed in air or under an inert gas such as nitrogen or argon. Drying and calcination may be performed at atmospheric pressure or under vacuum if desired.

Where the particulate catalyst compound comprises one or more reducible metals, the dried or calcined material may, if desired, be subjected to a reduction step to convert the reducible metal compounds to their corresponding metals. The reduction may be performed directly on the dried support structure without a calcination, or may be performed after calcination, to convert reducible metal oxides to the corresponding metals. The reduction may conveniently be performed using a hydrogen and/or carbon monoxide containing gas. Suitable reducing gases include hydrogen, 1-50% volume hydrogen/nitrogen and synthesis gas comprising hydrogen, carbon monoxide and carbon dioxide. The reduction may be achieved by exposing the support structure to a reducing gas at a temperature in the range 150 to 800° C., preferably 200 to 600° C. The optimal reduction temperature for each of the reducible metals are known or may be established using TPR. Catalysts comprising reduced metals such as Cu, Co, Ni and Fe may be pyrophoric and so it is desirable that in such cases in the surface of the catalyst is passivated by controlled exposure of the catalyst to an oxygen-containing gas stream to form a protective layer on the reduced metal.

In the present invention, the support structure may serve simply to support the catalytic metal or metals in the particulate catalyst compound, e.g. wherein the support structure is in the form of a honeycomb substrate monolith which can be washcoated with an appropriate catalyst, or it may itself serve a catalytic or other purpose. Where the support structure itself comprises a catalyst, this may serve the same or different function to the particulate catalyst compound.

Moreover, the ability of additive layer manufacturing to produce a myriad of support geometries enables the support structure to be created with a designed porosity that may function to increase catalyst activity in certain directions of flow or act as a filtration medium trapping components of the process fluid passing over or through the support structure.

The catalysts and catalyst precursors prepared using the method described herein may be used in any catalytic process, in which a reactant mixture is contacted with it under conditions to effect a catalysed reaction. Alternatively the support structures may be used in a sorption process to catalytically remove substances from a process fluid, which may be a liquid or a gas.

The catalysed reaction may be selected from hydroprocessing including hydrodesulphurisation, a hydrogenation, steam reforming including pre-reforming, catalytic steam reforming, autothermal reforming and secondary reforming and reforming processes used for the direct reduction of iron, catalytic partial oxidation, a water-gas shift including isothermal-shift, sour shift, low-temperature shift, intermediate temperature shift, medium temperature shift and high temperature shift reactions, a methanation, a hydrocarbon synthesis by the Fischer-Tropsch reaction, methanol synthesis, ammonia synthesis, VOC or methane oxidation, ammonia oxidation and nitrous oxide decomposition reactions, or oxidation, three-way catalysis or selective reduction reactions of internal combustion engine or power station exhaust gases.

The method is particularly suitable for manufacturing catalysts for ammonia oxidation, nitrous oxide abatement, catalytic partial oxidation and catalytic steam reforming of hydrocarbons, and for the selective oxidation and reduction of components of exhaust gases from internal combustion engines or power stations.

Ammonia oxidation processes, including the Andrussow process, may be performed by steps comprising passing a feed gas comprising a source of ammonia (e.g. ammonia itself or offgas from a urea plant) together with a source of oxygen, such as air, over a fixed bed of the catalyst, operating at temperatures of from 700 to 1000° C., preferably 800-1000° C. The catalyst may be used on its own or in combination with a precious metal gauze catalyst. In use alone the catalyst may function as an ammonia oxidation catalyst, whereas in combination it may act as an oxidation catalyst and also a catalyst for the decomposition or abatement of nitrous oxide (N2O), which is an undesirable by product. Especially suitable catalysts for this process comprise cobalt in a mixed oxide composition, for example the cerium-doped LaCoO$_3$ catalysts e.g. La$_x$Ce$_{1-x}$CoO$_3$ where x is 0.8-0.99, especially La$_{0.8}$Ce$_{0.2}$CoO$_3$, catalysts as described in WO 98/28073 A.

The sorption process may be a sorption selected from the recovery of sulphur compounds or heavy metals such as mercury and arsenic from contaminated gaseous or liquid fluid streams, or particulate matter from the exhaust gases of internal combustion engines and power stations. In particular, the method may be applied to manufacture honeycomb-type monolithic structures known as catalytic soot filters (wall-flow filters). The mean pore size (D50) of wall-flow filters can be selected for the desired application. For example, where the wall flow filter is for use in a catalysed soot filter for inter alia filtering particulate from a vehicular diesel exhaust gas, the mean pore size may be selected to be in the 10-25 micron range. Alternatively, if the wall-flow filter is for filtering particulate matter of a gasoline engine and is coated with a three-way catalyst, the D50 can be lower, e.g. 3-20 microns.

The invention is further illustrated by reference to the following Examples.

The surface areas of catalysts were determined according to ASTM D 3663-03. The nitrogen adsorption and desorption isotherms of catalysts were determined according to ASTM D 4222-03. Pore volumes were determined by mercury intrusion porosimetry according to ASTM D 4284-03. Particle size distributions were determined by laser light scattering according to ASTM D 4464-00. Compressive strength was measured using an H25KS Hounsfield Tensile Tester. Hardened compression test platens were employed, with the adjustable platen attached to crosshead above the fixed platen. A crosshead speed of 1 (mm/min) was employed for all tests.

EXAMPLE 1. PREPARATION OF SUPPORT STRUCTURES

A support mixture was prepared by mixing alpha alumina (MARTOXID PN-202, >70% alpha alumina; BET surface area 8-15 m$^2$/g; D50 2-4 µm) with titanium (IV) oxide (Acros Organics, anatase 99%) and copper (II) oxide (Fisher Scientific >98%). The alumina, titanium (IV) oxide and copper (II) oxide were used as received. Different binders and in one case cellulose fibres were combined with the resulting support mixture to create preform mixtures as follows;

| Preform mixture | Wt % | Ingredient |
|---|---|---|
| 1A | 88.2 | Alumina |
|  | 0.9 | CuO |
|  | 0.9 | TiO2 |
|  | 10 | PVA (Acros Organics 88% hydrolyzed; mean M.W 20,000-30,000) |
| 1B | 65.33 | Alumina |
|  | 0.67 | CuO |
|  | 0.67 | TiO2 |
|  | 13.33 | Sucrose (British Sugar, Silk Sugar) |
|  | 13.33 | Dextrin (Acros Organics) |
|  | 6.67 | Cellulose fibres (Sigma Aldrich type 50, 50 μm) |
| 1C | 70 | Alumina |
|  | 0.71 | CuO |
|  | 0.71 | TiO2 |
|  | 14.29 | Sucrose |
|  | 14.29 | Dextrin |
| 1D | 88.2 | Alumina |
|  | 1.8 | Magnesium Oxide (Fisher Scientific) |
|  | 10 | PVA (Acros Organics 88% hydrolyzed; mean M.W 20,000-30,000) |
| 1E | 88.2 | Alumina |
|  | 1.8 | Calcium Carbonate |
|  | 10 | PVA (Acros Organics 88% hydrolyzed; mean M.W 20,000-30,000) |
| 1F | 88.2 | Alumina |
|  | 1.8 | CuO |
|  | 10 | PVA (Acros Organics 88% hydrolyzed; mean M.W 20,000-30,000) |

The preform mixtures were placed in the hopper of a 3-D printing apparatus (ink-jet powder bed apparatus available from Voxeljet Technology AG) and used to 3-D print 10 mm cubic support structures. The layer thickness was set at 0.1 mm, the x-direction resolution from the print-head was 50 μm and the y-direction resolution was 88 μm.

The printed support structures were dried at 105° C. overnight and then calcined at 1200° C. for 2 hours.

The cubes were immersed in a bath of water at 22° C. The dry mass, buoyant mass and wet mass were recorded and from these the density and cold water pick-up (CWP) were determined. Five cubes were tested and a mean taken.

The compressive strength of the cubes was also measured. Measurements were made from the 'side' of the cube along the plane of the layers formed during the 3-D printing process (the x-direction) and from the 'top' of the cube through the layers (the z-direction). Two cubes were tested and a mean taken. The results were as follows;

| Preform mixture reference | Density (g/cm³) | CWP (ml/g) | Compressive strength (MPa) z | Compressive strength (MPa) x |
|---|---|---|---|---|
| 1A | 1.47 | 0.41 | 5.5 | 8.8 |
| 1B | 1.69 | 0.28 | 29.3 | 36.1 |
| 1C | 1.38 | 0.45 | 9.1 | 17.2 |

The PVA-bound structure has a higher CWP indicating a more porous structure. The cellulose fibres appear to have markedly increased the strength of the structure which also has a higher CWP.

The printing resolution was varied to determine its effect on porosity of the resulting structures. Lower densities and higher CWP figures were obtained for x-direction resolutions of 60 μm and 70 μm.

The support preparation was repeated for x-direction resolutions of 60 μm and either 40 μm or 70 μm. The D10, D50 and D90 of the main peaks of the porosimetry analysis for the supports 1A and 1B were as follows.

Support 1A

| Resolution | | | | | |
|---|---|---|---|---|---|
| 40 μm | | 50 μm | | 60 μm | |
| D50 (μm) | D10-D90 (μm) | D50 (μm) | D10-D90 (μm) | D50 (μm) | D10-D90 (μm) |
| 53.98 | 51.20 | 49.24 | 30.72 | 48.24 | 30.72 |

Support 1B

| Resolution | | | | | |
|---|---|---|---|---|---|
| 50 μm | | 60 μm | | 70 μm | |
| D50 (μm) | D10-D90 (μm) | D50 (μm) | D10-D90 (μm) | D50 (μm) | D10-D90 (μm) |
| 83.23 | 46.08 | 75.05 | 35.84 | 74.05 | 30.72 |

Support 1C:

| Resolution 65 μm | |
|---|---|
| D50 (μm) | D10-D90 (μm) |
| 60.3 | 34.84 |

EXAMPLE 2. PREPARATION OF CATALYSTS

Two cubes prepared from preform mixtures A, B, C, D, E & F according to the method of Example 1 using x-direction printing resolutions in the range 40-70 μm were dried at 105° C. overnight, fired at 1200° C. for 2 hours then allowed to cool, then coated with catalyst by dipping the cubes in a slurry of $La_{0.8}Ce_{0.2}CoO_3$.

The $La_{0.8}Ce_{0.2}CoO_3$ slurry was prepared by dispersing 400 g of $La_{0.8}Ce_{0.2}CoO_3$ prepared according to WO 98/28073 and milled in a bead mill to a $D_{50}$ particle size of 2.5 to 3.0 μm, in 600 ml of demineralized water (40% solids). This produced a slurry with a D10, D50 and D90 particle size of 0.956, 2.942 and 7.525 μm respectively. Two cubes were soaked in 60 ml of the slurry. The cubes were allowed to soak for 5 minutes, then removed and dried at 105° C. overnight. The catalyst pickup for the different cubes is given below;

| Preform mixture reference | Printing Resolution (μm) | Total Porosity (ml/g) | $La_{0.8}Ce_{0.2}CoO_3$ Loading (wt %) |
|---|---|---|---|
| 1A | 40 | 0.354 | 14.7 |
| 1A | 50 | 0.457 | 16.8 |
| 1A | 60 | 0.547 | 19.3 |

-continued

| Preform mixture reference | Printing Resolution ($\mu$m) | Total Porosity (ml/g) | $La_{0.8}Ce_{0.2}CoO_3$ Loading (wt %) |
|---|---|---|---|
| 1B | 50 | 0.327 | 11.2 |
| 1B | 60 | 0.548 | 23.3 |
| 1B | 70 | 0.460 | 19.6 |
| 1C | 65 | 0.470 | 19.1 |
| 1D | 65 | 1.016 | 41.1 |
| 1E | 65 | 0.904 | 36.4 |
| 1F | 65 | 0.854 | 39.6 |

If the catalyst loading is plotted against the total porosity for the supports 1A-1F it can be seen that there is a strong correlation. The plot is depicted in FIG. 1. FIG. 1 shows that in each case as the total porosity increases, the catalyst pickup also increases. Additionally, the results suggest that there are pore size distributions which are better than others at picking up the catalyst.

EXAMPLE 3. CATALYST TESTING $La_{0.8}Ce_{0.2}CoO_3$ catalysts were prepared on aluminosilicate and alumina tetrahedra-shaped support structures (with rectilinear basal dimensions of 7.95+/−0.5 mm and 7.3+/−0.5 mm and a height of 5.75+/−0.5 mm) according to the above method and tested for ammonia oxidation and nitrous oxide abatement in a laboratory test reactor.

The aluminosilicate support structure exhibited single major peak with a $d_{50}$ of 25.7 $\mu$m and a total intrusion volume of 0.484 ml/g.

|  | D50 ($\mu$m) | D10-D90 ($\mu$m) |
|---|---|---|
| aluminosilicate | 25.7 | 18.4 |
| alumina | 50.17 | 46.08 |

Two catalysts were prepared according to the methods described in Examples 1 and 2. Example 3a in which tetrahedra-shaped aluminosilicate structures were dip coated with a 40 wt % slurry of $La_{0.8}Ce_{0.2}CoO_3$ (as described in Example 2) and dried at 105° C. to provide a catalyst with 25 wt % $La_{0.8}Ce_{0.2}CoO_3$; and Example 3b, which was prepared in an identical manner to Example 3a but further subjected to calcination in air at 900° C. for 6 hours after drying.

For comparison, $La_{0.8}Ce_{0.2}CoO_3$ cylindrical catalyst pellets prepared by conventional pelleting methods were also tested.

The test method was as follows. A known mass of catalyst was loaded into a quartz reactor tube of internal diameter 24.6 mm to give a 20 mm deep catalyst bed. A thermocouple was placed 1 mm into the bottom of the bed to measure the catalyst temperature during the tests. A second thermocouple placed 25 mm above the top of the bed measured the inlet gas temperature. Catalyst performance and activity was determined using one of two different test procedures. A quadrupole mass spectrometer was used to measure the concentrations of various background gases and nitrogen-containing species during the course of each method and the data collected was used to assess the catalyst performance.

Procedure (I). Nitrous Oxide Abatement. A synthetic air mixture comprising 10.5% $O_2$, 1% Ar and balance He was flowed over the catalyst bed at a rate of 35 L min$^{-1}$ and pre heated to 100° C. A 0.3 L min$^{-1}$ flow of 25% $N_2O$ in $N_2$ was then added to the air mixture and the reactor was heated to 850° C. at a rate of 10° C. min$^{-1}$. The reaction was allowed to dwell at 850° C. for 30 minutes before being cooled back down to 100° C. at 10° C. min$^{-1}$. The concentration of nitrous oxide which has been abated, $[N_2O]_A$, was calculated by measuring the concentration of the evolved gas at time=t, $[N_2O]_t$, and subtracting from the initial concentration at time=0, $[N_2O]_0$. Percentage abatement was then calculated by division of $[N_2O]_A$ with $[N_2O]_0$.

Procedure (II) Ammonia Oxidation. A synthetic air mixture comprising 10.5% $O_2$, 1% Ar and balance He was flowed over the catalyst bed at a rate of 35 L min$^{-1}$ and pre heated to 100° C. A 1.85 L min$^{-1}$ ammonia flow was then added to the air mixture and the reactor was then heated to 415° C. at a rate of 10° C. min$^{-1}$. The reaction was allowed to dwell at a 415° C. preheat for 30 minutes before being cooled back down to 100° C. at 10° C. min$^{-1}$. The exotherm from the ammonia oxidation reaction combines with the preheat temperature to give a maximum catalyst temperature between 750° C. and 900° C. The ammonia oxidation was reported as the percentages of NO, $N_2$ and $N_2O$ selectivity.

The nitrous oxide abatement results were as follows;

| Example | Catalyst shape | $La_{0.8}Ce_{0.2}CoO_3$ content (wt %) | Nitrous oxide abatement (%) 700° C. | 800° C. |
|---|---|---|---|---|
| Example 3a | tetrahedra | 25 | 45 | 71 |
| Example 3b | tetrahedra | 25 | 45 | 70 |
| Comparative pellets | cylinders | >95 | 52 | 71 |

These results suggest that, despite a lower active catalyst content, at temperatures close to plant operation temperatures (800-900° C.) the coated catalysts appear to perform equally as well as the solid $La_{0.8}Ce_{0.2}CoO_3$ pellets.

The ammonia oxidation results were as follows;

| Example | NO Selectivity (%) | $N_2$ Selectivity (%) | $N_2O$ Selectivity (%) |
|---|---|---|---|
| Example 3a | 80.56 | 17.42 | 2.02 |
| Example 3b | 86.92 | 10.25 | 2.83 |

These results suggest that there was a small increase in NO selectivity after the coated material was fired at 900° C.

The effect of the particle size of the particulate catalyst compound in the slurry was investigated using three further catalysts

EXAMPLE 3C

Milled $La_{0.8}Ce_{0.2}CoO_3$ slurry dip coated on to aluminosilicate tetrahedra supports.

EXAMPLE 3D

Unmilled $La_{0.8}Ce_{0.2}CoO_3$ slurry dip coated on to aluminosilicate tetrahedra supports.

EXAMPLE 3E

Milled $La_{0.8}Ce_{0.2}CoO_3$ slurry dip coated on to alumina tetrahedra supports.

The milled slurries were prepared as per Example 2, the unmilled slurry had a particle size distribution of D10 1.48, D50 7.68 and D90 36.09 µm.

The nitrous oxide abatement results were as follows;

| Example | Shaped support | $La_{0.8}Ce_{0.2}CoO_3$ content (wt %) | Nitrous oxide abatement (%) 750° C. | 850° C. |
|---|---|---|---|---|
| Example 3c | aluminosilicate tetrahedra | 8.1 | 26 | 40 |
| Example 3d | aluminosilicate tetrahedra | 3.7 | 10 | 25 |
| Example 3e | alumina tetrahedra | 13.0 | 57 | 80 |

These results suggest that that the material prepared using alumina supports has higher activity than material prepared on aluminosilicate supports. The results also suggest that samples prepared with milled $La_{0.8}Ce_{0.2}CoO_3$ slurries have higher activity towards $N_2O$ abatement than the sample prepared with unmilled $La_{0.8}Ce_{0.2}CoO_3$ slurry.

EXAMPLE 4. CATALYST TESTING WITH PRECIOUS METAL GAUZES

The Example 3a and Example 3e catalysts were also tested in combination with precious metal ammonia oxidation catalysts. In these tests a reactor basket of 40 mm internal diameter was charged with a 5 ply gauze pack containing 5% Rhodium and 95% Platinum (5RhPt) on top of a low density stainless steel woven gauze. The $La_{0.8}Ce_{0.2}CoO_3$ catalysts were then charged, pre-weighed, underneath the 5RhPt gauze pack. Another stainless steel woven gauze was clamped into the lower basket flange to support the $La_{0.8}Ce_{0.2}CoO_3$ catalyst. Unless otherwise stated, the $La_{0.8}Ce_{0.2}CoO_3$ catalyst bed is 54 mm deep and 40 mm in diameter. Unless otherwise stated, the catalysts were tested over 10 days under the following process conditions: 10 $Nm^3h^{-1}$ air, 10% vol $NH_3$, 200° C. preheat and 4 bara. The evolved gases were analysed and the conversion efficiency (for $NH_3$ to NO, expressed as a percentage) and amount of $N_2O$ by-product in the product gas stream recorded.

The results are given below;

|  | 2 days | 4 days | 6 days | 8 days | 10 days |
|---|---|---|---|---|---|
| Nitrous oxide produced (ppmv) | | | | | |
| Example 3e | 880 | 880 | 890 | 900 | 910 |
| Example 3a | 800 | 900 | 960 | 1000 | 1000 |
| Ammonia oxidation conversion efficiency (%) | | | | | |
| Example 3e | 92.0 | 92.0 | 92.1 | 92.2 | 92.1 |
| Example 3a | 95.0 | 94.3 | 93.6 | 93.6 | 93.6 |

Under the same conditions, the 5RhPt catalyst on its own provides a conversion efficiency of 94-95% and a $N_2O$ level of 1300-1400 ppmv.

These results indicate that both catalysts demonstrated an increase in the $N_2O$ produced over the course of the first two of days. Conversion efficiency remained reasonably steady at 92-94%.

EXAMPLE 5. CATALYST PREPARATION AND TESTING

ALM alumina and zirconia catalyst supports structures in the form of solid cylinders (diameter 3.7 mm, length 3.6 mm) were prepared using the apparatus and conditions set out in Example 1 but which were fired at 1700° C. for 2 hours.

| Alumina | | Zirconia | |
|---|---|---|---|
| D50 (µm) | D10-D90 (µm) | D50 (µm) | D10-D90 (µm) |
| 50.17 | 46.08 | 23.10 | 23.04 |

The support structures were impregnated with milled slurries of $La_{0.8}Ce_{0.2}CoO_3$ as set out in Example 2.

The resulting catalysts were tested according to the method set out in Example 4 above (Examples 5(d)-(f)) or in combination with a precious metal catalyst (Examples 5(a)-(c)) for conversion efficiency and $N_2O$ production. Unless otherwise stated, the $La_{0.8}Ce_{0.2}CoO_3$ catalyst bed is 54 mm deep and 40 mm in diameter. Unless otherwise stated, the catalysts were tested for approximately 2 days under the following process conditions: 10 $Nm^3h^{-1}$ air, 10% vol $NH_3$, 200° C. preheat and 4 bara. The evolved gases were analysed and the conversion efficiency (for $NH_3$ to NO, expressed as a percentage) and amount of $N_2O$ by-product in the product gas stream recorded. The results are given below;

| Catalyst | | | | |
|---|---|---|---|---|
| PGM catalyst | Support structure composition | $La_{0.8}Ce_{0.2}CoO_3$ loading (wt %) | Conversion efficiency (%) | $N_2O$ (ppmv) |
| Example 5(a) | 5 ply 5RhPt | 100% $Al_2O_3$ | 12 | 95.4 | 400 |
| Example 5(b) | 5 ply 5RhPt | 98% $Al_2O_3$ 1% CuO 1% $TiO_2$ | 13 | 95.2 | 300 |

| | PGM catalyst | Support structure composition | $La_{0.8}Ce_{0.2}CoO_3$ loading (wt %) | Conversion efficiency (%) | $N_2O$ (ppmv) |
|---|---|---|---|---|---|
| Example 5(c) | 1 ply 5RhPt | 100% $Al_2O_3$ | 32 | 93.1 (16 days) | 141 (16 days) |
| Example 5(d) | None | 100% alumina (Bed depth 32 mm) | 23 | 93.3 | 90 |
| Example 5(e) | None | 100% alumina | 35 | 95.0 (17 days) | 12 (17 days) |
| Example 5(f) | None | Zirconium (IV) Oxide (98.5%) Acros Organics | 7.8 | 92.5 | 80 |
| Comparative | None | None | >95 pellet | 92.0 | 80 |
| Comparative | 1ply 5RhPt | None | >95 pellet | 93.9 | 116 |
| Comparative | 5ply 5RhPt | None | >95 pellet | 93.0 | 110 |
| Comparative | 5ply 5RhPt | None | none | 94-95 | 1300-1400 |

These results indicate that the coated support structures are able to effectively convert ammonia to nitric oxide with remarkably low N2O levels compared to conventional PGM or pelleted catalysts.

The invention claimed is:

1. A method for producing a catalyst or catalyst precursor comprising:
   (i) combining particles of a support material with a binder to form a particulate preform mixture, wherein (a) the binder is a particulate binder material in which case the particulate preform mixture comprises a blended particulate mixture of the support material particles and the particulate binder material or (b) the binder is applied as a coating to the surface of the particles of the support material, in which case the particulate preform mixture comprises the support material particles coated with the binder coating;
   (ii) forming a layer of the particulate preform mixture;
   (iii) applying a binding solvent from a print-head to the layer of particulate preform mixture according to a predetermined pattern, wherein the binding solvent dissolves the binder contacted by the binder solvent, thereby causing the binder contacted by the binding solvent to dissolve and then bind the particulate support material together according to the pre-determined pattern, and leaving the particles of the support material and binder not contacted by the binding solvent as unbound particulate material;
   (iv) repeating (ii) and (iii) layer upon layer;
   (v) removing the unbound particulate material;
   (vi) drying and optionally calcining to form a support structure;
   (vii) applying a slurry of a particulate catalyst compound in a carrier fluid to the support structure to form a slurry-impregnated support; and
   (viii) drying and optionally calcining the slurry-impregnated support to form a catalyst or catalyst precursor, wherein the mean particle size (D50) of the particulate catalyst compound in the slurry is in the range of from 1 to 50 μm and the support structure has a porosity of 0.02 ml/g or greater.

2. The method of claim 1, wherein the particles of the support material have a particle size in a range of from 0.1 micron to 400 microns.

3. The method of claim 1, wherein the particles of the support material comprise an alumina, metal-aluminate, silica, alumino-silicate, cordierite, titanium (IV) oxide, zirconia, cerium (IV) oxide, zinc oxide, or a mixture thereof, a zeolite, a metal powder, silicon carbide, silicon nitride, or carbon.

4. The method of claim 1, wherein the particles of the support material comprises one or more of a hydrous alumina, transition alumina, alpha alumina, or metal-aluminate.

5. The method of claim 1, wherein the binder is dextrin, sucrose, or a mixture thereof or PVA.

6. The method of claim 1, wherein the particulate preform mixture contains polymer or ceramic fibres in a range of from 1% to 10% by weight, relative to the weight of the particulate preform mixture.

7. The method of claim 1, wherein the particulate preform mixture contains one or more sintering aids that are titanium oxide, iron oxide, copper oxide, magnesium oxide, or calcium carbonate in a range of from 0.5% to 5% by weight, relative to the weight of the particulate preform mixture.

8. The method of claim 7, wherein the sintering aid is a mixture of titanium (IV) oxide and iron (III) oxide, or a mixture of titanium (IV) oxide and copper (II) oxide.

9. The method of claim 8, wherein the weight ratio range of $TiO_2$ to $Fe_2O_3$ or $TiO_2$ to CuO is in a range of from 40:60 to 60:40.

10. The method of claim 1, wherein the layers of preform material each have a thickness in the range of from 0.02 to 5.0 mm.

11. The method of claim 10, wherein each of the layers of preform material have a thickness in the range of from 0.02 mm to 2.5 mm.

12. The method of claim 1, wherein the binding solvent is an organic solvent or water.

13. The method of claim 1, wherein the printing head is used at printing resolution in the x-direction in the range of from 40 μm to 70 μm and in the y-direction of 80 to 100 μm for layer thicknesses in the range of from 50 to 150 μm.

14. The method of claim 1, wherein the dried support structure is subjected to a calcination stage at a temperature in the range of from 500° C. to 2000° C.

15. The method of claim 1, wherein the slurry has a solids content in the range of from 5 to 80% by weight, relative to the weight of the slurry.

16. The method of claim 1, wherein the particulate catalyst compound applied to the support structure comprises a metal powder, metal compound, or a zeolite.

17. The method of claim 16, wherein the particulate catalyst compound applied to the support structure comprises a metal oxide, metal hydroxide, metal carbonate, metal hydroxycarbonate or mixture thereof of one or more of Na, K, Mg, Ca, Ba, Al, Si, Sn, Sb, Pb, or Ce.

18. The method of claim 1, wherein the particulate catalyst compound comprises a precious metal powder that is one or more of Pt, Pd, Rh, Ir, Ru, or Re.

19. The method of claim 1, wherein the particulate catalyst compound is one or more transition metal compound.

20. The method of claim 19, wherein the transition metal compound comprises one or more of Ti, V, Cr, Mn, Fe, Co, Ni, Cu, Zn, Y, Zr, Nb, Mo, Ru, Rh, Pd, Ag, La, Hf, W, Re, Ir, Pt, Au, or Ce.

21. The method of claim 19, wherein the transition metal compound is a transition metal oxide, transition metal hydroxide, transition metal carbonate, transition metal hydroxycarbonate or mixture thereof.

22. The method of claim 19, wherein the particulate catalyst compound is a bulk catalyst particle in which the catalytic metal is distributed throughout the particle or is a coated catalyst particle in which the catalytic metal is present as a surface layer on the surfaces of the particle.

23. The method of claim 19, wherein the particulate catalyst compound comprises one or more of Pt, Pd, Rh, or Ir coated onto a support material.

24. The method of claim 19, wherein the particulate catalyst compound is a coated or bulk catalyst comprising one or more of Ni, Co, Mo, W, Cu, or Fe.

25. The method of claim 19, wherein the particulate catalyst compound is $LaCoO_3$, $LaCoO_3$ in which partial substitution of the A-site has been made by Sr or Ce, zirconia or a mixture thereof, or $Co_3O_4$ promoted by rare earth elements.

26. The method of claim 1, wherein the support has a porosity of in a range of from 0.02 ml/g to 1.4 mL/g.

27. The method of claim 1, wherein the particles of the support material are porous, having a pore size distribution (D50) in a range of from 10 microns to 25 microns.

28. The method of claim 1, wherein the mean particle size (D50) of the particulate catalyst compound in the slurry is in the range of from 1 micron to 50 microns.

29. The method of claim 1, wherein the particles of the support material are porous, having a pore size distribution (D50), and the mean particle size (D50) of the particulate catalyst compound is less than the pore size distribution (D50) of the particles of support material.

* * * * *